United States Patent
Stenkamp et al.

(10) Patent No.: US 7,540,475 B2
(45) Date of Patent: Jun. 2, 2009

(54) MIXING IN WICKING STRUCTURES AND THE USE OF ENHANCED MIXING WITHIN WICKS IN MICROCHANNEL DEVICES

(75) Inventors: Victoria S. Stenkamp, Richland, WA (US); Ward E. TeGrotenhuis, Kennewick, WA (US); Robert S. Wegeng, Alexandria, VA (US)

(73) Assignee: Battelle Memorial Institute, Richland, WA (US)

( * ) Notice: Subject to any disclaimer, the term of this patent is extended or adjusted under 35 U.S.C. 154(b) by 495 days.

(21) Appl. No.: 11/229,349

(22) Filed: Sep. 16, 2005

(65) Prior Publication Data
US 2007/0063360 A1   Mar. 22, 2007

(51) Int. Cl.
*B01F 3/04* (2006.01)
(52) U.S. Cl. .......................... 261/99; 261/154
(58) Field of Classification Search .................. 261/99, 261/154
See application file for complete search history.

(56) References Cited

U.S. PATENT DOCUMENTS

| | | |
|---|---|---|
| 3,170,512 A | 2/1965 | Smith |
| 3,563,727 A | 2/1971 | Algerd et al. |
| 3,564,819 A | 2/1971 | Neulander et al. |
| 3,587,730 A | 6/1971 | Milton |
| 3,720,044 A | 3/1973 | Grove et al. |
| 3,837,146 A | 9/1974 | Faure et al. |
| 4,117,079 A | 9/1978 | Bellows et al. |
| 4,187,086 A | 2/1980 | Walmet et al. |
| 4,239,728 A | 12/1980 | Stenberg et al. |
| 4,715,436 A | 12/1987 | Takahashi et al. |
| 4,770,238 A | 9/1988 | Owen |
| 4,903,761 A | 2/1990 | Cima |
| 4,999,107 A | 3/1991 | Guerif |
| 5,126,045 A | 6/1992 | Kohlheb et al. |
| 5,225,080 A | 7/1993 | Karbachsch et al. |
| 5,281,254 A | 1/1994 | Birbara et al. |
| 5,453,641 A | 9/1995 | Mundinger et al. |
| 5,486,475 A | 1/1996 | Kramer et al. |
| 5,775,410 A | 7/1998 | Ramm-Schmidt et al. |
| 5,800,595 A | 9/1998 | Wright |
| 5,919,284 A | 7/1999 | Perry, Jr. et al. |
| 6,010,554 A | 1/2000 | Birmingham et al. |
| 6,126,723 A | 10/2000 | Drost et al. |

(Continued)

FOREIGN PATENT DOCUMENTS

EP   1256376 A   11/2002

(Continued)

OTHER PUBLICATIONS

PCT International Search Report Mailed Feb. 9, 2007.

(Continued)

*Primary Examiner*—Robert A Hopkins
(74) *Attorney, Agent, or Firm*—Frank Rosenberg; Derek H. Maughan

(57) ABSTRACT

Advanced wicking structures and methods utilizing these structures are described. The use of advanced wicking structures can promote rapid mass transfer while maintaining high capillary pressure through the use of small pores. Particularly improved results in fluid contacting processes can be achieved by enhanced mixing within a wicking layer within a microchannel.

24 Claims, 5 Drawing Sheets

U.S. PATENT DOCUMENTS

| | | |
|---|---|---|
| 6,168,647 B1 | 1/2001 | Perry, Jr. et al. |
| 6,171,374 B1 | 1/2001 | Barton et al. |
| 6,258,154 B1 | 7/2001 | Berndt et al. |
| 6,332,913 B1 | 12/2001 | Breitschwerdt et al. |
| 6,503,298 B1 | 1/2003 | Monzyk et al. |
| 6,666,909 B1 | 12/2003 | TeGrotenhuis et al. |
| 6,869,462 B2 | 3/2005 | TeGrotenhuis et al. |
| 6,875,247 B2 | 4/2005 | TeGrotenhuis et al. |
| 7,051,540 B2 | 5/2006 | TeGrotenhuis et al. |
| 7,297,324 B2 | 11/2007 | TeGrotenhuis et al. |
| 7,344,576 B2 | 3/2008 | TeGrotenhuis et al. |
| 7,434,411 B2 | 10/2008 | Drost et al. |
| 2001/0042716 A1 | 11/2001 | Iversen et al. |
| 2002/0144600 A1 | 10/2002 | TeGrotenhuis et al. |
| 2003/0033932 A1 | 2/2003 | Sirkar et al. |
| 2003/0221554 A1 | 12/2003 | TeGrotenhuis et al. |
| 2004/0041285 A1* | 3/2004 | Xiang et al. .................. 261/99 |
| 2006/0016215 A1 | 1/2006 | Tonkovich et al. |
| 2006/0016216 A1 | 1/2006 | Tonkovich et al. |
| 2006/0142401 A1 | 6/2006 | Tonkovich et al. |
| 2006/0249020 A1 | 11/2006 | Tonkovich |
| 2007/0085227 A1 | 4/2007 | Tonkovich et al. |

FOREIGN PATENT DOCUMENTS

| | | |
|---|---|---|
| JP | 2000-329490 | 11/2000 |
| WO | WO 01/93976 | 12/2001 |
| WO | WO 03/049835 | 6/2003 |

OTHER PUBLICATIONS

PCT Written opinion of the International Searching Authority mailed Feb. 9, 2007.

Hessel et al., "Micromixers—a review on passive and active mixing principles," Chem. Eng. Sci 60, 2479-2501 (2005).

Jensen, "Smaller, faster chemistry," Nature, 393, 735, 737 (1998).

Stroock et al., "Controlling Flows in Microchannels with Patterned Surface Charge and Topography," Acc. Chem. Res. 36, 597-604 (2003).

Stroock et al., "Chatic Mixer for Microchannels," Science, 295, 647-651 (2002).

Schonfeld et al, "Simulation of Helical Flows in Microchannels," AIChE Journal, 50, 771-778 (2004).

Chew et al., "Techniques to enhance fluid micro-mixing and chaotic micromixers," Mod. Phys. Lett. B, 19, 1567-1570 (2005).

* cited by examiner

MIXING IN WICKING STRUCTURES AND THE USE OF ENHANCED MIXING WITHIN WICKS IN MICROCHANNEL DEVICES

This invention was made with Government support under Contract DE-AC0676RLO1830 awarded by the U.S. Department of Energy. The Government has certain rights in the invention.

FIELD OF THE INVENTION

The present invention relates to processes and devices that utilize wicks within channels.

INTRODUCTION

Engineers at Battelle have pioneered the development of wick-containing microchannel devices for processes such as phase separation, condensation with phase separation, gas absorption and desorption, and distillation. Wicks can be incorporated within channels of laminated devices. An embodiment of one such device is illustrated in FIG. 6 of U.S. Pat. No. 6,666,909. A cross-sectional view of this gas/liquid contactor is illustrated in FIG. 1. This contactor has end plates 54 and 56 and alternating shims 51 and 52. T-joint inlets 60 and 62 are for the passage of gas and liquid respectively. T-joint outlets 64 and 66 are for the passage of gas and liquid respectively. A top-down view of shim 51 is illustrated in FIG. 2. Gas flows in through gas inlet holes 76 and out through outlet holes 72. A bottom-up view of shim 52 is illustrated in FIG. 3. Liquid flows in through wick channels 82 through the wick and out through wick channels 84. A wick insert is illustrated in FIG. 4. The wick insert has through holes 92 for gas flow through the wick. Regions 94 of the insert can be continuous wick or can be holes that are filled with a continuous wick through the wick channels. Where the wick insert covers regions 94, disks or other inserts of a wicking material should be disposed in channels 78, 79, 82 and 84 to provide a continuous capillary liquid flow path. Use of microchannels in shim 52 can obviate the need for a wick insert. Endplate 54 has wick channels (not shown) corresponding to the wick channels in shim 52. Endplate 56 has gas inlet and outlet holes (not shown) corresponding to inlet and outlet holes 72 and 76. This device illustrates a preferred counterflow of liquid and gas phases. Where the liquid is used to selectively absorb components from the gas phase, the counterflow construction contacts the gas with the lowest concentration of extractable components with the purest liquid and thus provides for maximal absorbtion of the gas components. This is only one example from a large number of wick-containing devices and processes using these devices that are published in the engineering and patent literature. These publications may be referred to for some examples of devices and processes that, according to the present invention, may be modified to employ the advanced wicking structures described below. For example, U.S. Pat. Nos. 6,666,909, 6,869,462 and 6,875,247, which are incorporated herein as if reproduced in full below.

In prior patents, a wick is described as a uniform material, a mixture of materials, a composite material, or a gradient material. For example, a wick could be graded by pore size or wettability to help drain liquid in a desired direction. Examples of wick materials include: sintered metals, metal screens, metal foams, polymer fibers including cellulosic fibers, or other wetting, porous materials. The capillary pore sizes in the wick materials are preferably in the range of 10 nm to 1 mm, more preferably 100 nm to 0.1 mm, where these sizes are the largest pore diameters in the cross-section of a wick observed by scanning electron microscopy (SEM). In a preferred embodiment, the wick is, or includes, a microchannel structure. Liquid in the microchannels migrates by capillary flow. The microchannels can be of any length, preferably the microchannels have a depth of 1 to 1000 micrometers (μm), more preferably 10 to 500 μm. In a preferred embodiment, the microchannels are microgrooves, that is, having a constant or decreasing width from the top to the bottom of the groove. In another embodiment, the microchannels form the mouth to a larger diameter pore for liquid transport. Example 2 of U.S. Pat. No. 6,666,909 reports the use of a Pall Supramesh™ material having a layer of sintered stainless steel overlying a fine stainless steel mesh.

As noted in prior work, the wick is preferably not permitted to dry out during operation since this could result in gas escaping through the wick. One approach for avoiding dryout is to add a flow restrictor in capillary contact with the wick structure, such as a porous structure with a smaller pore size than the wick structure and limiting the magnitude of the suction pressure such that the non-wetting phase(s) cannot displace the wetting phase from the flow restrictor. This type of restrictor is also known as a pore throat. In preferred embodiments, a pore throat is provided between the wick and the liquid flow channel and/or at the liquid outlet. In some embodiments, the wick can have a small pore diameter such that it serves to transport fluids from the gas channel and also prevents gas intrusion, thus serving the dual purpose of a wick and a pore throat.

Ideal wicking structures exhibit high permeability so that high flow capacity and low pressure drop occur. However, small pore sizes are required for good capillary pumping capacity, as described by the Young-LaPlace equation. These two characteristics appear at odds with each other, but engineers in the heat pipe industry have solved this problem by creating special wicking structures that are referred to as either monogrooves (G. P. Peterson, "An Introduction to Heat Pipes," John Wiley and Sons, New York, 1994, p. 5) or open arteries (A. Faghari, "Heat Pipe Science and Technology," Taylor and Francis, 1995, p. 26). In these structures, good permeability is maintained by the circular groove, while a narrow neck creates high pumping capacity. A cross-section of a heat pipe with open arteries surrounding a gas channel is shown in FIG. 5. This concept however, is undesirable for liquid-gas contact since the available for mass transfer would be small relative to the wicking volume; resulting in undesirable slow mass transfer.

There are numerous examples of microreactors with mixers within a microchannel architecture. In these devices, two or more fluids are mixed together. A review of micromixers has been provided by Hessel et al. in "Micromixers—a review on passive and active mixing principles," Chem. Eng. Sci. 60, 2479-2501 (2005). Such mixers include: flow dividing and recombining structures; patterned surfaces (such as a herringbone pattern, see Stroock et al. "Controlling Flows in Microchannels with Patterned Surface Charge and Topography," Acc. Chem. Res. 36, 597-604 (2003); electrically patterned (see Stroock et al.) zig-zag channels; substream injection via multi-hole plates, and structural packings such as a helix. None of the prior art incorporates a static mixer within a wick.

SUMMARY OF THE INVENTION

In a first aspect, the present invention provides apparatus for contacting fluids, comprising: a fluid inlet; a channel connected to the fluid inlet; and a liquid outlet. The channel comprises an open channel connected to the fluid inlet, and a wick. The apparatus also includes a mixer adapted to enhance fluid mixing within the wick. The liquid outlet or a liquid channel is connected to the wick. Preferably, the apparatus is a laminated device.

In any of the aspects described, the open channel preferably has a height of 0.1 mm to 10 mm, more preferably 0.5 to 5 mm. The wick preferably has a height of 5 mm or less, more preferably 1 mm or less, and in some embodiments in the range of 0.1 mm to 1 mm. The channel height is the sum of wick height and open channel height. The width and length of the components are less important and, in some embodiments, have the microchannel dimensions mentioned elsewhere.

As is typical patent terminology, the term "comprising" means "including;" there could be additional components and there could be one or more of the stated components. For example, apparatus "comprising" a fluid inlet would include devices having 1, 2 or more fluid inlets.

In a further aspect, the invention provides a process of contacting fluids comprising: passing at least two separate fluid streams into a device having at least one channel; wherein the channel comprises an open area and a wick; flowing at least one fluid through the wick, and flowing at least one other fluid through the open area; mixing the fluid within the wick. There is mass transfer occurring between the at least one fluid flowing through the wick and the at least one other fluid flowing through the open area.

In another aspect, the invention provides wicking apparatus, comprising:

a fluid inlet; a channel connected to the fluid inlet; the channel comprising an open channel connected to the fluid inlet and an advanced wicking structure; and a liquid outlet or a liquid channel. The liquid outlet or a liquid channel is connected to the advanced wicking structure. The apparatus is preferably a laminated device.

In a further aspect, the invention provides a process of wicking a fluid, comprising: passing at least one fluid stream into a device having at least one channel; and flowing the liquid in the wick in either rotational flow or flow that splits and recombines within the wick. The channel comprises an open channel and a wick. In this aspect, a liquid flows in the wick and gas flows through the open channel.

The invention also provides a process of contacting fluids in which at least two fluids are passed into a device having at least one channel. The channel has an open area and a wicking region with enhanced mixing capability such as can be provided with a static or advanced wicking structure. During operation, at least one fluid flows through the wicking region, and at least one other fluid flows through the open area; one fluid contacts at least one other immiscible fluid, and there is mass transfer occurring between the at least one fluid flowing through the wicking region, and the at least one other fluid flowing through the open area.

Fluid contacting is useful for absorption, desorption, distillation, solvent extraction, stripping and rectification. Other applications include reactive chemical separation techniques, such as reactive distillation.

In this invention, transport of mass and/or heat is enhanced by mixing within a wick, thus accomplishing a process intensification similar to that which might be accomplished by making thinner wicks and flow channels. Mass transfer in physical processes can be characterized by the Sherwood number, $$Sh = \frac{h_m d}{D}$$

where $h_m$ is the mass transfer coefficient, d is the length-scale for mass transfer, and D is molecular diffusivity. One definition of the mass transfer coefficient is the mass flux (mass flow per unit area) divided by the characteristic mass transfer driving force, which for mass diffusion into a thin film could be the surface concentration minus the bulk mean concentration. For a constant Sherwood number, decreasing the length-scale for mass transfer, d, corresponding to the wick thickness, increases the mass transfer coefficient, $h_m$, thereby enhancing mass transfer and intensifying the process. As described in this invention, a structure can be introduced in the wick that will induce mixing or flow behavior that will enhance the effective diffusivity or the Sherwood number over the transport exhibited by an unstructured wick of the same thickness.

In addition to wicks, optional pore throats and optional capture structures may be present in the invention. A wick is a material that will preferentially retain a wetting fluid by capillary forces and through which there are multiple continuous channels through which liquids may travel by capillary flow. The channels can be regularly or irregularly shaped. Liquid will migrate through a dry wick, while liquid in a liquid-containing wick can be transported by applying a pressure differential, such as suction, to a part or parts of the wick. A wick is not merely a wall coating such as a typical metal oxide wash coat. The permeability needs to be sufficient to support a reasonable flow rate, which a wash coat would not do. The capillary pore size in the wick can be selected based on the contact angle of the liquid and the intended pressure gradient in the device, and the surface tension of the liquid. Preferably, the pressure at which gas will intrude into the wick should be greater than the pressure differential across the wick during operation—this will exclude gas from the wick.

The liquid preferentially resides in the wick due to surface forces, i.e. wettability, and is held there by interfacial tension. The liquid prefers the wick to the gas channel and as long as there is capacity in the wick, liquid remains in or is segregated from the gas stream and does not leave in the gas stream.

In some preferred embodiments, a wick is disposed in a microchannel. Microchannels can be of any length, preferably the microchannels have a depth of 1 to 1000 micrometers (µm), more preferably 10 to 500 µm. Preferably the microchannels have a width of 1 to 1000 millimeters, more preferably 10 to 100 millimeters. In a preferred embodiment, the microchannels are microgrooves, that is, having a constant or decreasing width from the top to the bottom of the groove.

Furthermore, wicks can be comprised of layers of different structures with at least one layer adjacent to a gas flow channel (surface layer) that has pores or openings that wet the liquid and retain liquid by surface tensions forces. The surface layer supports a pressure gradient within the wick in a lateral direction that produces liquid flow through the wick. The other layers (inner layers) of such a wick will remain fully saturated during normal operation and accommodate bulk flow of the liquid. In one embodiment of a layered wick, the inner layer is comprised of microgrooves or microchannels and the surface layer comprised of a sheet of porous material, such as a woven screen, an expanded metal screen, a felt material, or sintered metal. In another embodiment, the one or more inner layer(s) are porous materials with higher porosity and/or larger pore size than the surface layer.

The liquid in a pore throat has a bubble point that is greater than the maximum pressure difference across the pore throat during operation. This precludes intrusion of gas into the pore throat due to capillary forces (surface tension, wettability, and contact angle dependent). A pore throat can be used to seal the liquid exit, so there should be a seal around the pore throat or the pore throat should cover the exit in order to prevent gas from bypassing the pore throat. The pore throat is preferably very thin to maximize liquid flow through the pore throat at a give pressure drop across the pore throat. Preferably, the pore throat has a pore size that is less than half that of the wick and a thickness of 50% or less than the wick's thickness; more preferably the pore throat has a pore size that is 20% or less that of the wick. Preferably, the pore throat is in capillary contact with the wicking material to prevent gas from being trapped between the wick and the pore throat and blocking the exit.

Flooding can result from exceeding the flow capacity of the device for the wetting phase through the wick; the flow capacity is determined by the pore structure of the wick, the cross-sectional area for flow, or the pressure drop in the wick in the direction of flow.

A capture structure can be inserted (at least partly) within the gas flow channel, and in liquid contact with the wick. A capture structure assists in removing (capturing) a liquid from the gas stream. One example of a capture structure are cones that protrude from the wick; liquid can condense on the cones and migrate into the wick—an example of this capture structure is shown in U.S. Pat. No. 3,289,752, incorporated herein by reference. Other capture structures include inverted cones, a liquid-nonwetting porous structure having a pore size gradient with pore sizes getting larger toward the wick, a liquid-wetting porous structure having a pore size gradient with pore sizes getting smaller toward the wick and fibers such as found in commercial demisters or filter media. Mechanisms for capturing dispersed liquid particles include impingement (due to flow around obstructions), Brownian capture (long residence time in high surface area structure), gravity, centrifugal forces (high curvature in flow), or incorporating fields, such as electrical or sonic fields, to induce aerosol particle motion relative to the flow field.

In preferred embodiments, wicks are disposed in laminated devices with gas flow channels and wicking regions that are essentially planar in the fluid separation regions. This configuration allows high throughput, rapid and uniform rates of mass and heat transport, and provides a large surface area to volume ratio for high efficiency. In some preferred embodiments, layers are stacked to have separate gas flow channels in 2 to 600 separate layers, more preferably between 4 and 40 separate layers containing gas flow channels. As an alternative to the parallel arrangement, the channels could be connected in series to create a longer flow path. In some preferred embodiments, the gas flow channels and/or liquid flow channels have dimensions of width and length that are at least 10 times larger than the dimension of height (which is perpendicular to net gas flow).

The invention also includes methods of fluid processing (preferably contacting of fluids) using any of the structures and apparatus described herein.

The invention, in various aspects and embodiments can provide numerous advantages including: rapid mass transport, high rates of heat transfer, low cost, durability, and improved flow properties (combined higher permeability and pumping pressure) in a compact space.

Glossary of Terms

An "active mixer" enhances mixing by applying energy such as electrical or sonic energy.

An "advanced wicking structure" is a structure that meets the testing results described below.

A "capture structure" is a structure disposed (at least partly) within a gas flow channel that assists movement of a liquid into the wick.

"Device volume" refers to the entire volume of the device, including channels, headers, and shims.

"Entrainment" refers to transport of liquid into the gas exit

"Flow microchannel" refers to a microchannel through which a fluid flows during normal operation of an apparatus.

A "laminated device" is a device having at least two non-identical layers, wherein these at least two nonidentical layers can perform a unit operation, such as heat transfer, condensation, etc., and where each of the two nonidentical layers are capable having a fluid flow through the layer. In the present invention, a laminated device is not a bundle of fibers in a fluid medium.

A "liquid" is a substance that is in the liquid phase within the wick under the relevant operating conditions.

"Microchannel" refers to a channel having at least one dimension of 5 mm or less. The length of a microchannel is defined as the furthest direction a fluid could flow, during normal operation, before hitting a wall. The width and depth are perpendicular to length, and to each other, and, in the illustrated embodiments, width is measured in the plane of a shim or layer.

"Microcomponent" is a component that, during operation, is part of a unit process operation and has a dimension that is 1 mm or less.

"Pore throat" refers to a porous structure having a maximum pore dimension such that a non-wetting fluid is restricted from displacing a wetting fluid contained with the pore throat under normal operating conditions.

"Residence time" refers to the time that a fluid occupies a given working volume.

A "static mixer" is a structure within or adjacent a wick that enhances mixing within the wick. There are many known static mixers for mixing in microchannels, and, in the present invention these may be used in conjunction with a wick to promote fluid mixing in the wick.

A "substance" is a chemical compound or molecule.

"Unit process operation" refers to an operation in which the chemical or physical properties of a fluid stream are modified. Unit process operations (also called unit operations) may include modifications in a fluid stream's temperature, pressure or composition.

A "wicking region" is the volume occupied by a wick, or, a wicking surface such as a grooved microchannel surface.

"Working volume" refers to the total channel volume of the device, and excludes the headers and solid shim and end plate materials.

DETAILED DESCRIPTION

Figure 1:
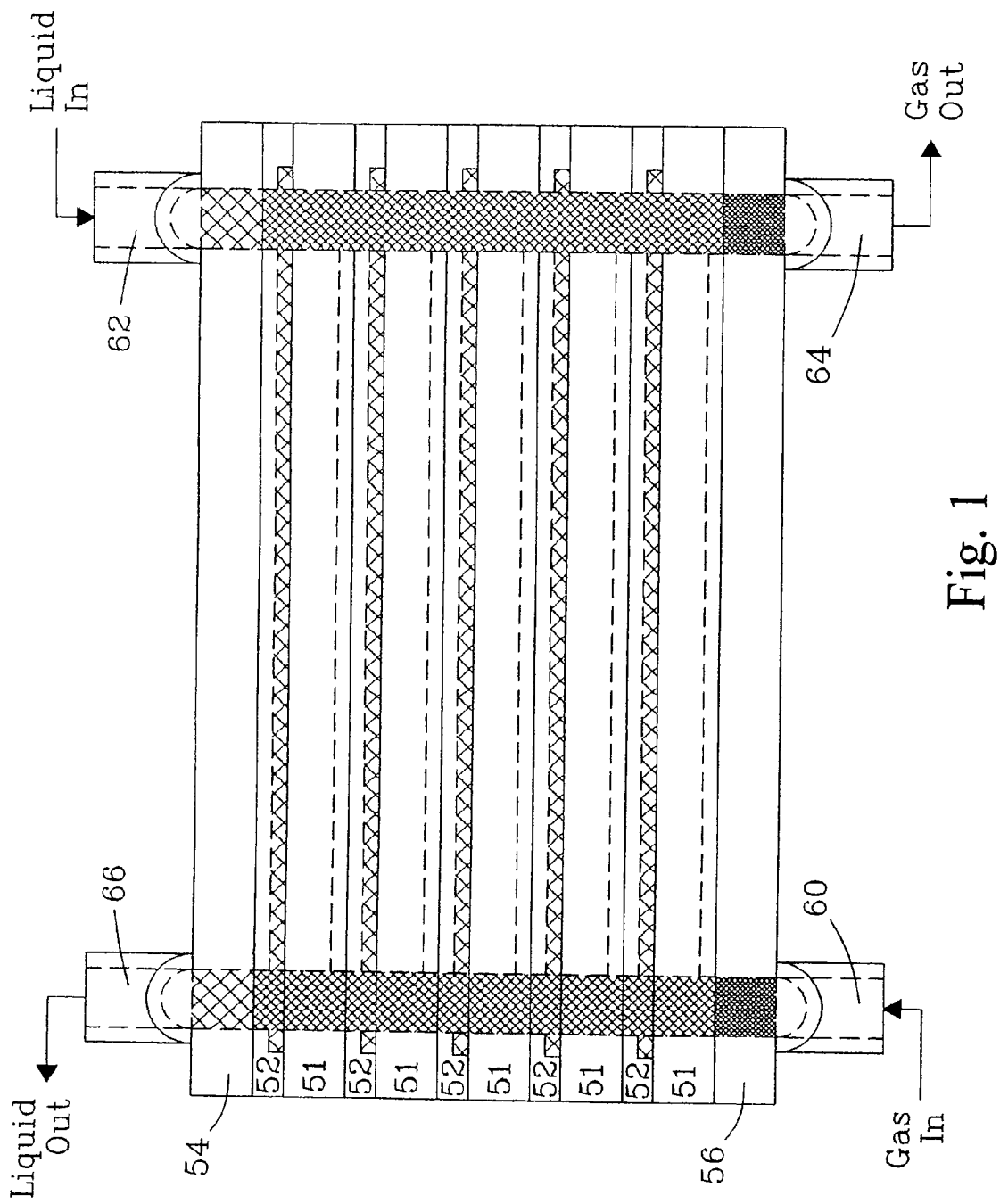
FIG. 1 is a cross-sectional view of a contactor as described in U.S. Pat. No. 6,666,909.
Figure 2:
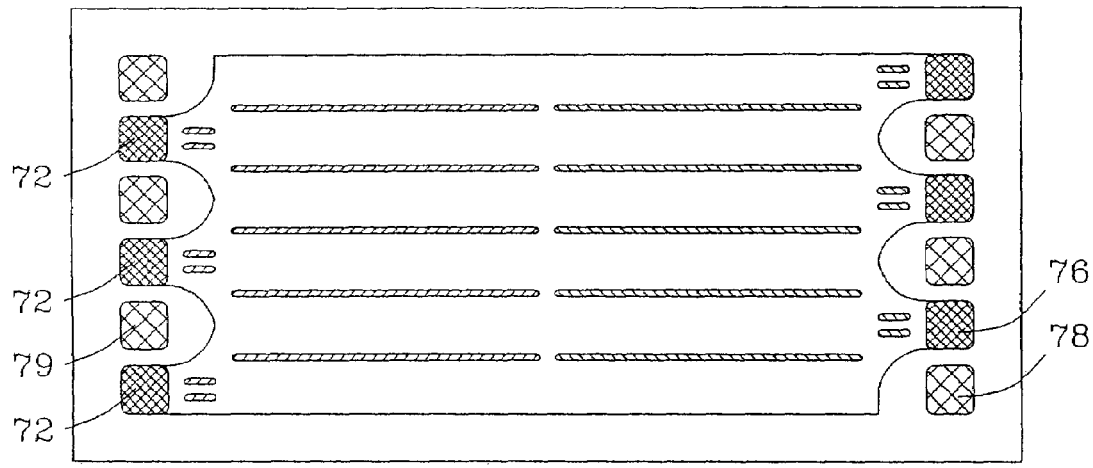
FIG. 2 is a top-down view of a gas flow channel layer of the gas/liquid contactor.
Figure 3:
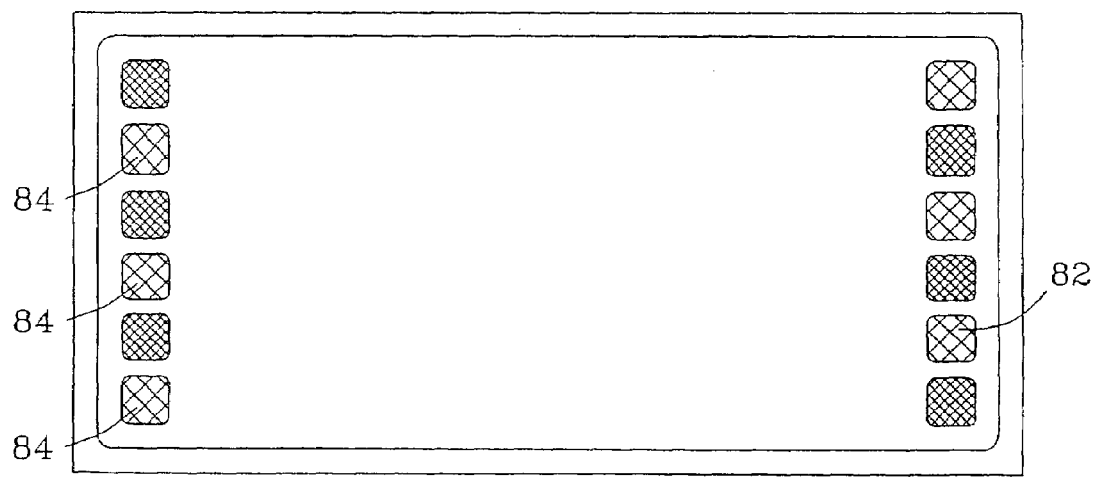
FIG. 3 is a bottom-up view of a liquid flow channel layer of the gas/liquid contactor.
Figure 4:
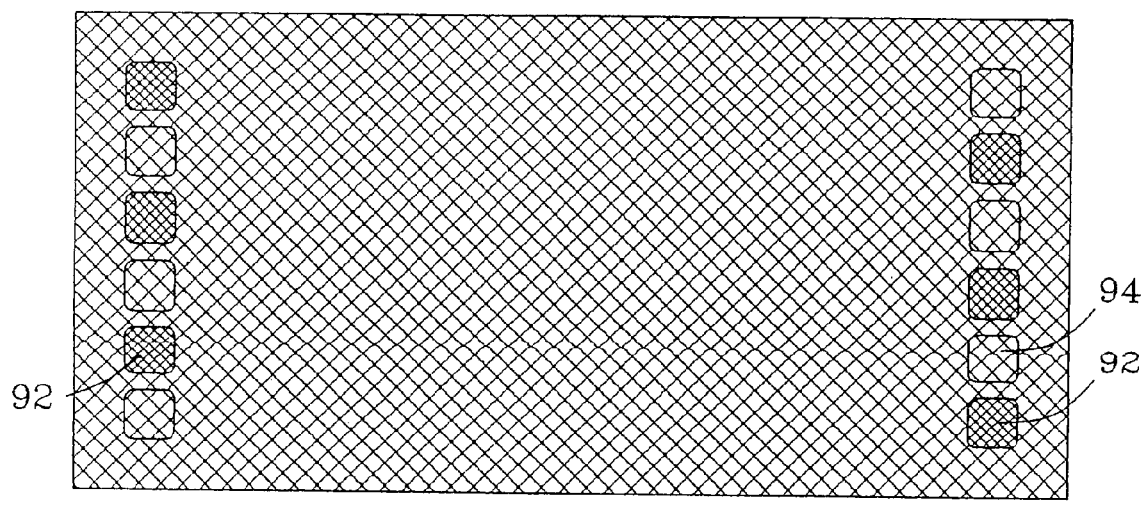
FIG. 4 illustrates a wick insert.

Devices containing a wick can be made of metals, plastics, ceramic or composite materials. Metal shims (for making a laminated device) can be made by etching; conventional cutting, grinding and machining; electrical discharge machining (EDM); laser machining; stamping or coining; extrusion; molding techniques; or deposition techniques, such as rapid-prototyping, chemical vapor deposition, or electro deposition. Plastic shims can be made using the same techniques or by conventional plastic forming techniques, including injection molding, hot embossing, stamping, casting, and other molding techniques. Ceramic shims could be made using techniques well known for fabricating ceramic parts, including those used in fabricating solid oxide fuel cell elements. The shim material facing the gas channel can be made hydrophobic through coatings, treatment or by the choice of material. The shims can be stacked with wicks installed within the liquid flow channel, either held in loosely by the lands and channel walls or by adhering the wicks to the liquid channel wall. The wick or pore throat must prevent an open path for the gas to flow to the liquid exit. This can be accomplished either by close tolerances between the wick or pore throat structure and the walls; by using a sealant, such as epoxy, polymer, or braze material to install the wick or pore throat; or through the use of gaskets or o-rings. The seams between shims and between end plates and shims can be sealed by bonding or by a compression seal. Bonding can be accomplished by diffusion bonding, by brazing or soldering, by ultrasonic welding, by combustion synthesis, by chemical reaction, such as using an epoxy resin, or by gluing with an adhesive material. A compression seal can be accomplished using gaskets, O-rings, or by surface to surface contact and bolting the device together. Inlets and outlets can be connected by the same methods, by welding, by screws or bolts, or by other known connection techniques.

When making low volumes of a given device or when the device needs to be disassembled for cleaning or modifications, the preferred fabrication technique is to fabricate the shims and end plates by conventional machining, such as by milling, or by EDM. Seals between the shims and end plates are preferably accomplished by compression seals using either O-rings placed in grooves machined into one of the sealing surfaces or by using a gasket material cut to match the profile of the sealing surface. The device is then held together in compression using bolts. The liquid exit is isolated from the gas flow channel using gaskets or sealant, such as epoxy, between the wick or pore throat and the wall. Inlets and outlets can be installed using standard threaded fittings or other known connection techniques, such as brazed joints.

The devices and processes are especially desirable for integration in a system. These systems can accomplish desired functions such as heat transfer, mass transfer, heterogeneous reaction, electrochemical reactions, or electric field enhancements. When integrated as an element in a chemical reactor, the inventive devices can result in process intensification (e.g., reduced mass transport residence times) and/or greater than equilibrium conversion and selectivity for chemical reactions. Combination with a heat exchanger can facilitate multi-phase endothermic or exothermic chemical reactions.

Heterogeneous catalytic reactions can be accomplished by impregnating active catalyst materials in the wicking structure for liquid phase reactions and/or in the capture structure for gas phase reaction. One example is Fischer-Tropsch synthesis, where condensable hydrocarbons are produced. Reactor residence time can be reduced by the incorporation of structures that remove liquid hydrocarbon products in contact with the catalyst structure. The devices can also be used in an integral reactor-chemical separator. For example, the wick or an absorbent material within the wick can selectively remove one of the products. This causes a shift in the equilbrium conversion as well as improved selectivity. Other, nonlimiting, examples include low temperature water gas shift reaction, where we believe that selectively removing CO could lower the operating temperature for achieving adequate conversion. This effect could be enhanced by flowing an absorbent liquid countercurrent to a flowing gas stream.

The Sherwood number for mass transfer or Nusselt number for heat transfer for a given physical process is influenced by geometry and the flow behavior of the liquid. For example, the Sherwood number for turbulent flow at Reynolds numbers above 2100 is much larger than for laminar flow at Reynolds numbers below 2100. However, the Sherwood number (or Nuselt number) can be increased for laminar flow below Reynolds number of 2100 by modifications of the geometry, as is well-known in the literature on micromixers (Hessel, V., H. Lowe, F. Schonfeld, Chemical Engineering Science, 60 (2005) 2479-2501). Whereas, these structures are typically used to mix two miscible fluids together, the concepts are also useful for increasing the Sherwood or Nusselt number associated with transport processes with wicks.

In this invention known concepts for mixing miscible fluids using micromixers can be applied to accelerate the transfer of mass or heat into or out of a liquid flowing through a thin wicking structure. The principle mechanisms for affecting enhanced heat and mass transfer using static mixers are 1) inducing secondary or recirculation flows and 2) inducing flow splitting and recombining (SAR), and 3) stretching and folding. Mechanisms for active mixing include employing electrical or ultrasonic forces. Some, non-limiting, embodiments of deploying structures within wicks to enhance transport are described below.

In one embodiment, a wick consisting of open microchannels with one side comprised of the surface layer and a herringbone pattern (FIG. 15 of Hessel) deployed on the side opposite the surface that is adjacent to a gas flow channel. The fluid develops secondary rotational flow cells as it passes down the microchannels bringing fluid initially far from the surface layer of the wick to the surface layer where heat or mass transfer can occur more readily with the gas phase in contact with the liquid phase in the surface layer. Similarly, if heat transfer is occurring through the wall where the herringbone structure is located, fluid that is initially far from that wall will move toward that wall where heat transfer can occur more readily.

In another embodiment, an inner layer (or layers) of a layered wick contain helical or intersecting structures (see FIG. 14 of Hessel) what will cause flow stretching and folding or splitting and recombining respectively that will cause fluid initially near the surface layer(s) of the wick to intermix with fluid far from the surface layer. This will enhance diffusive transport within the intermixed liquid.

One approach for realizing helical or intersecting flow structures within a layered wick is to use the tetrahedral wire structures of expanded metal screens, such as those supplied by Delker, .Inc. The flow path for fluid flowing in the plane of these structures is very dependent on the orientation of the screen relative to the flow direction. In two directions, flow paths are relatively straight and unimpeded and the straight flow lines will not induce secondary flow behavior as desired. However, if the direction of flow requires the fluid to flow around the wires then the flow path becomes more tortuous and secondary flow behavior become possible. By constructing wicks from multiple layers of tetrahedral wire screens and orienting the wires specifically to induce intermixing or helical flow behavior, the desired enhanced transport can be achieved.

Other split and recombine structures that can be deployed within wick structures include (but are not limited to) caterpillar structures (Schonfeld, F., V. Hessel, and C. Hofmann, 2004, *Lab on a Chip*, 4, 65-69), fork-like (Schwesinger, N. and T. Frank, 1995, WO 96/30113, Merck Patent GmbH, Darmstadt, Germany), ramp-like (Branebjerg, J., U. D. Larsen, and G. Blankenstein, Eds. 1996, Proc. of $2^{nd}$ Int. Symp. On Miniaturized Total Analysis Systems; Analytical Methods & Instrumentation, Special Issue microTAS'96, Basel, 228-230 and Lowe et al., 2000, $4^{th}$ Int. Conf. on Microreaction Tech., IMRET 4, Atlanta, USA, AIChE Topical Conf Proc., 31-47), and curved architectures. Mixing, wicking flow channels can be constructed from wicks in which flow splits apart and recombines—for example, patterned channels (such as may be etched in a channel wall) that contain a fibrous wick In another embodiment, wicking, open microchannels (without additional wicks within the microchannels and, optionally, spaced from a gas channel by a pore throat) split and recombining flow within the microchannels. These structures intermix fluid that is near the surface layer of the wick with the rest of the fluid to enhance diffusive heat and mass transfer.

Another known mechanism to enhance mixing is hydrodynamic focusing, where the flow area is reduced, similar to a Venturi, forcing localized reduction in convective-diffusive lengthscale. A wicking structure containing periodic focusing structures where regions of increased flow area, increased mass transfer length-scale, and slower flow would alternate with regions of decreased flow area, decreased mass transfer length-scale and faster velocity. The former regions would facilitate mass transfer between the liquid phase in the wick and the adjacent gas phase and the latter would facilitate mass transfer within the liquid in the wick.

Yet another embodiment of a micromixer that is deployable is the combination of smaller channels and larger tortuous channels (He, B. et al., 2001, Analytical Chemistry, 73(9), 1942-1947). Fluid supply to the larger channels is dispersed by the smaller channels giving both the effect of axial dispersion in the net flow direction and smaller transport lengthscales and longer residence times in the shorter channels.

Other embodiments of enhanced transport in wicks include use of active mixing structures where the energy for mixing is supplied by an external source and not the hydrodynamic pressure. These active mixing approaches include periodic flow switching (Glasgow, I. and N. Aubry, 2003, Lab on a Chip, 3, 114-120), electro-osmotic flow switching (Qian S. and H. H. Bau, 2002, Analytical Chemistry, 74(15), 3616-3625), acoustic fluid shaking (Liu, R. H. et al., 2002, Lab on a Chip, 2, 151-157), electrokinetic instability (Oddy, M. H., J. G. Santiago, J. C. Mikkelsen, 2001, Analytical Chemistry, 73(24), 5822-5832), and ultrasonic/piezoelectric membrane actuation (Yang, Z., et al., 2001, Sensors and Actuators A, 93, 266-272).

Figure 5:
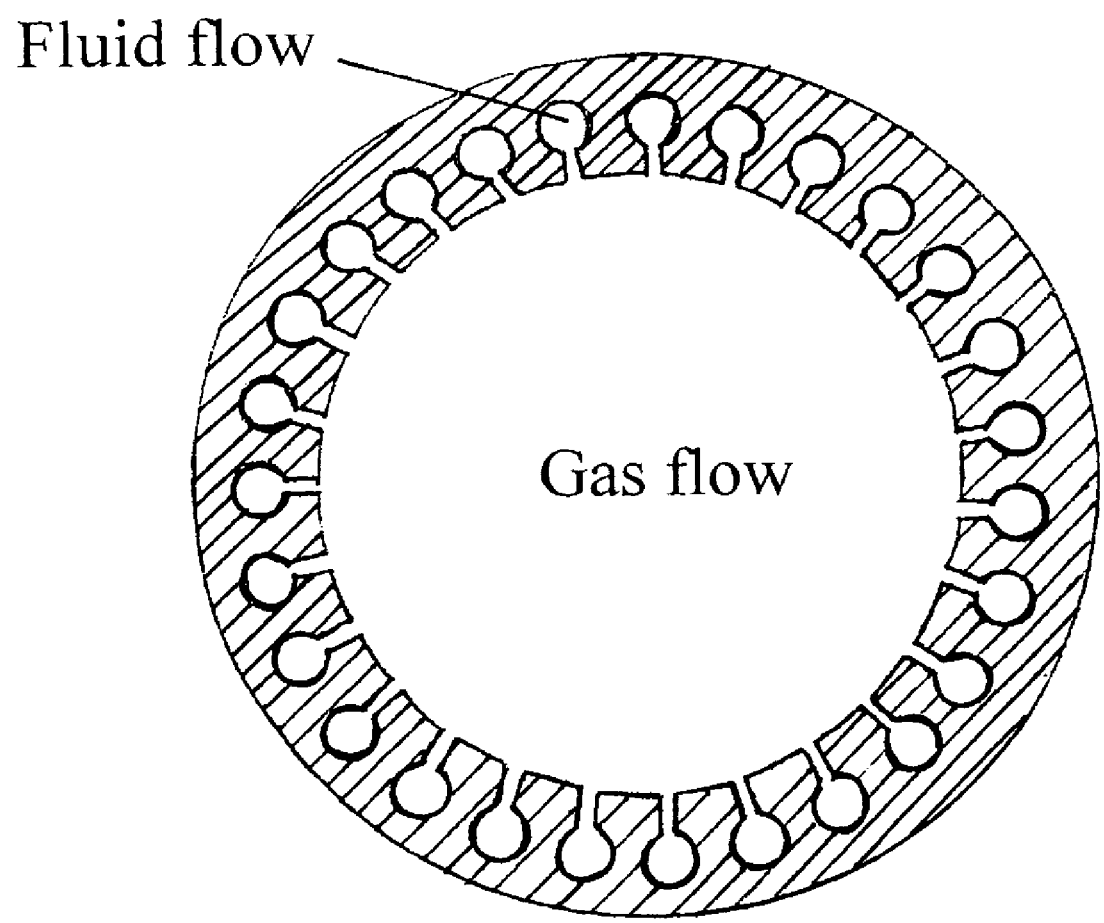
FIG. 5 is a cross-sectional view of a gas flow channel (the large central channel) connected via necks to open arteries for fluid flow.

Any of the enhanced mixing wicks can be separated from the open channel by a surface layer of a relatively small pore material (even in this case, the wick is still termed "adjacent" the open channel). For example, in a wicking structure that includes liquid flow arteries connected via narrow necks to a gas flow channel (see, for example FIG. 5 which, in the present invention, could alternatively have a planar structure with necks and arteries on one or both sides of a planar channel). The liquid flow arteries contain a structure to enhance mixing such as: patterned surfaces, baffles, or mixing channels. A wick may comprise a fine pore membrane at the interface between an open channel (i.e., a gas flow channel) and a wick (which contains relatively larger pores than the fine pore membrane). The average pore size (volumetric average) of the fine pore membrane is at least 30% smaller than the volumetric average pore size of the underlying wick. The "wick" in this case can be, for example, a collection of beads, or a patterned surface separated by a small distance from the small pore membrane such that a capillary effect forms between the surface and the membrane. Previously, it would have been considered undesirable to use an intervening fine pore membrane between an open channel and a wick because it would slow mass transfer. The advantage of a fine pore membrane is to increase the capillary pumping pressure while providing the flexibility to structure the inner layer (here, wick) to provide mixing.

Figure 6:
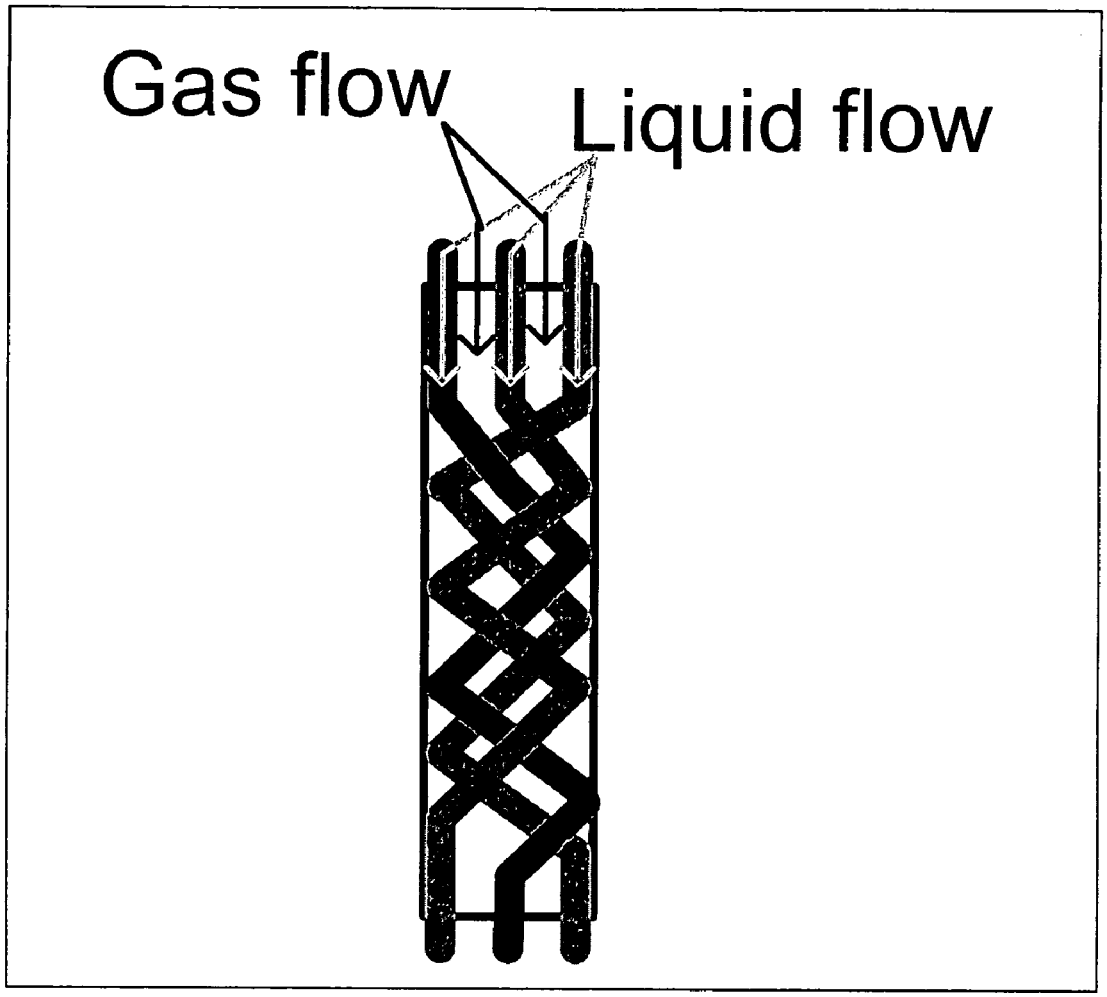
FIG. 6 illustrates a channel containing a loosely braided wick composed of 3 wicking strands.

FIG. 6 illustrates a loose twisted braid mixer/diffuser. In a preferred embodiment, at least 3 wicks are intertwined to form a loose braid, but the intertwined wicks are not tightened. The crisscrossing design exposes all sides of the wicking material and therefore the liquid to the gas phase enabling faster diffusion. The curved wicking strands create curved pores which may enable chaotic mixing of the liquid by creating dean vertices. A chaotic mixer for single phase mixing in microchannels has been demonstrated by Jiang et al. *AIChE J.* 50 (9), 2297-2305 (2004). They did not incorporate a wicking structure and limited it to single phase. In the inventive braided wick, the crisscrossing wicking strands will mix the liquid (especially at the points of contact between strands) and will also cause the gas phase to mix also using the split and recombination approach—the strands split the gas flow and then recombine it multiple times. The use of the term "strands" to describe the braids is not intended to limit the wick to fiber-based materials, but may include any of the aforementioned wick materials. The braid comprises at least two, preferably at least 3 intertwined strands. Thus, the invention includes a braided wick in a channel, and methods in which a liquid is transported through the braided wick.

An "advanced wicking structure" is defined by the "advanced wicking structure test," which is as follows. A wick is tested in an existing device or placed in an appropriately matched channel having an open region for gas flow. The channel has a width that matches the wick width, and the open region is twice the volume of the wick volume. A wick that is normally operated adjacent a patterned surface will be tested adjacent an identically patterned surface (and compared to a wick adjacent a smooth surface). For wicks that are not hydrophobic (which will wet when touching water at room temperature and pressure), 20 wt % aqueous ammonia at about 20° C. is passed through the wick at a Fourier number of 1.0 while ammonia at about 20° C. is passed through the gas channel at 1.0 atm. Flow through the wick is in the desired flow direction which is typically the largest dimension. The ammonia concentration of the liquid exiting the channel is measured. This is compared to an identical wick run under identical conditions except without any mixing structures (this is termed the "standard"). A wick resulting in an ammonia content that is at least 20% greater than the standard is termed an "advanced wicking structure." For a wick with a nonuniform composition, the standard wick is the same composition as the surface layer facing the open channel—for example, a wick with a sintered steel surface overlying a steel mesh is compared to a standard wick that is formed only of a sintered steel overlaying an open channel to the same overall wick thickness. For hydrophobic wicks, the comparison is the same except that the liquid in the wick is cyclohexanol at 65° C. and the gas is cyclohexane at about 65° C. and 1 atm.

It should be recognized that the test procedure should be followed as closely as practicable, keeping in mind that some variations may be required for testing some structures; and that variations can be accommodated, by the person of ordinary skill in working with micro-contactors, to accurately measure the extent of mixing in the wick.

The invention claimed is:

1. Apparatus for contacting fluids, comprising:
   a fluid inlet;
   a channel connected to the fluid inlet;
     the channel comprising an open channel connected to the fluid inlet, and a wick;
   a mixer adapted to enhance fluid mixing within the wick; and
   a liquid outlet;
     wherein the liquid outlet or a liquid channel is connected to the wick.

2. The apparatus of claim 1 comprising:
   a laminated device comprising at least 2 essentially planar layers that each comprise:
     a channel comprising an open channel and a wick; and
     a mixer adapted to enhance fluid mixing within the wick.

3. The apparatus of claim 2 comprising a laminated device comprising 2 to 600 essentially planar layers that each comprise:
   a channel comprising an open channel and a wick; and
   a mixer adapted to enhance fluid mixing within the wick.

4. The apparatus of claim 1 wherein the mixer is a static mixer.

5. The apparatus of claim 1 wherein the mixer is an active mixer.

6. The apparatus of claim 2 wherein the wick is essentially planar.

7. The apparatus of claim 1 wherein the open channel has a height of 0.1 mm to 10 mm, and the wick has a height of 5 mm or less.

8. The apparatus of claim 4 wherein the static mixer comprises a helix.

9. The apparatus of claim 1 wherein the channel comprises a patterned surface and wherein the wick is disposed on the patterned surface.

10. The apparatus of claim 2 wherein the wick comprises an active catalyst material.

11. The apparatus of claim 10 comprising an active catalyst material for catalyzing the Fischer-Tropsch synthesis and further comprising structures that are capable of removing liquid hydrocarbon products from contact with the active catalyst material.

12. The apparatus of claim 11 further comprising an adsorbent material within the wick.

13. The apparatus of claim 4 wherein the wick comprises at least 3 wicks that are intertwined to form a braid.

14. The apparatus of claim 3 wherein the wick comprises helical or intersecting structures.

15. A process of contacting fluids comprising:
    passing at least two separate fluid streams into a device having at least one channel;
      wherein the channel comprises an open area and a wick;
    flowing at least one fluid through the wicking region, and flowing at least one other fluid through the open area;
    mixing the liquid within the wick;
    wherein there is mass transfer occurring between the at least one fluid flowing through the wick, and the at least one other fluid flowing through the open area.

16. The process of claim 15 wherein the mixing occurs by use of a static mixer or advanced wicking structure.

17. The process of claim 15 wherein the mixing occurs by use of an active mixer.

18. The process of claim 15 wherein the step of mixing the liquid comprises using a static mixer to induce splitting and recombining or to induce stretching and folding.

19. Wicking apparatus, comprising:
    a fluid inlet;
    a channel connected to the fluid inlet;
      the channel comprising an open channel connected to the fluid inlet and an advanced wicking structure; and
    a liquid outlet or a liquid channel;
    wherein the liquid outlet or a liquid channel is connected to the advanced wicking structure.

20. The apparatus of claim 19 comprising:
    a laminated device comprising at least 2 essentially planar layers that each comprise:
      a channel comprising an open channel and an advanced wicking structure.

21. The apparatus of claim 20 comprising a laminated device comprising 2 to 600 essentially planar layers that each comprise:
    a channel comprising an open channel and an advanced wicking structure.

22. The apparatus of claim 19 wherein the advanced wicking structure comprises a wick on a patterned surface.

23. The apparatus of claim 19 wherein the advanced wicking structure comprises periodic focusing structures in which regions of increased flow area, increased mass transfer length-scale, and slower flow would alternate with regions of decreased flow area, decreased mass transfer length-scale, and faster velocity.

24. The apparatus of claim 19 wherein the open channel has dimensions of width and length that are at least 10 times larger than the dimension of height.

* * * * *